April 24, 1956 A. H. PRATT 2,743,380

PROTECTION CIRCUITS FOR CATHODE RAY TUBES

Filed May 4, 1953

Inventor
ALAN HERBERT PRATT
By
Attorney

United States Patent Office 2,743,380

Patented Apr. 24, 1956

2,743,380

PROTECTION CIRCUITS FOR CATHODE RAY TUBES

Alan Herbert Pratt, London, England, assignor to Electric & Musical Industries Limited, Hayes, England, a company of Great Britain Application May 4, 1953, Serial No. 352,953

Claims priority, application Great Britain May 8, 1952

2 Claims. (Cl. 315—20)

Figures 1, 2:
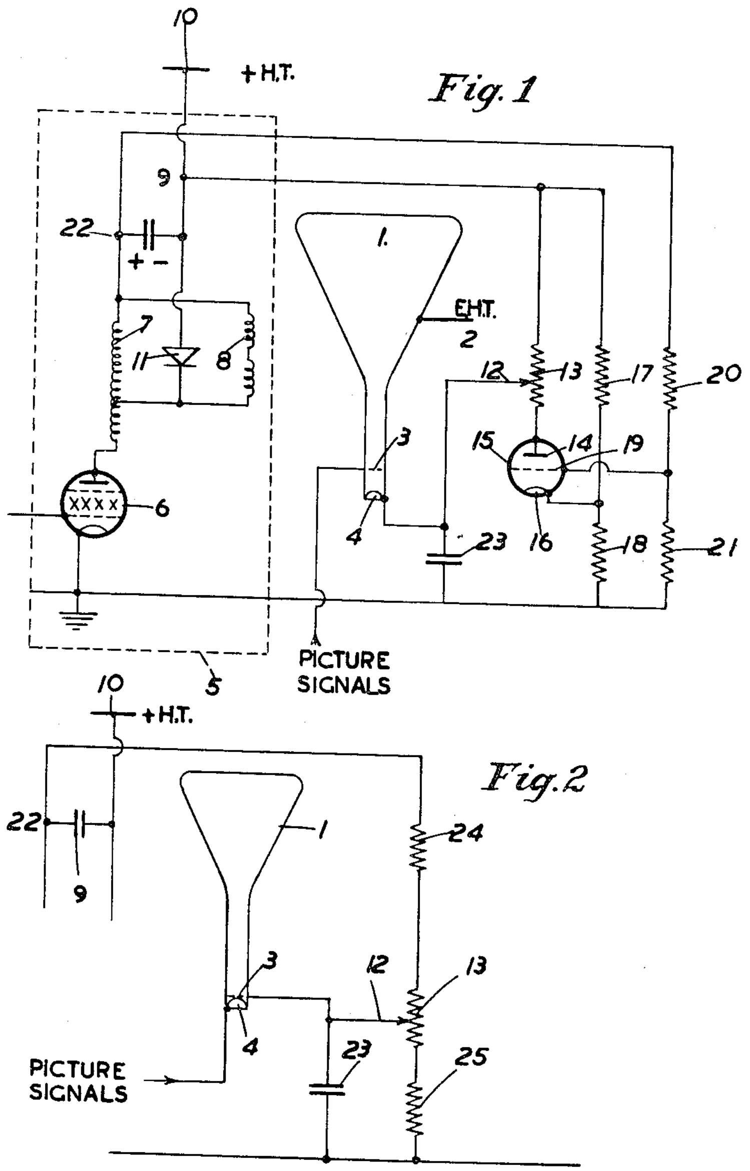

This invention relates to circuits for cathode ray tubes wherein provision is made for protection of the tube against circuit failures and has particular, but not exclusive, reference to such circuits employed in television receivers of the projection type.

As is well known extra high tension for the cathode ray tubes of television receivers is commonly derived from large amplitude potential excursions of an oscillatory character locally generated by the receiver. In a widely used application of this method potential excursions of large amplitude set up in the output circuit of the line scanning valve are rectified and smoothed to provide the extra high tension. This is a form of circuit that in large measure provides automatic protection of the screen of the cathode ray tube against damage by the cathode ray beam, since should the line scanning action fail the high operating potential for the tube automatically ceases and there is little risk of a slowly moving beam destroying the phosphor of the tube screen. In the event of failure of the frame scan the operating potential of the tube remains but with the rapid deflection of line scan there is little danger of damage to the phosphor.

In another form of extra high tension circuit using a locally generated oscillation to provide the extra high tension the oscillation is that provided by an entirely separate oscillator which may generate either sinusoidal oscillations or impulsive oscillations. This form of circuit is normally used for television receivers of the projection type since with these receivers the scanning circuits do not generate excursions of potential sufficient to set up the very high operating potentials required for projection tubes at the high values of beam current employed. As the circuit employs a source of extra high tension which is independent of the operation of the scanning circuits of the tube and as the energy of the beam is great, it is highly desirable to provide means that will safeguard the screen of the tube in the event of the failure of the line scanning circuit.

As is also well known it is a common practice in television receiver to regain energy after it has been employed for line scan and utilise the energy to augment the high tension supply for the line scan output valve.

It is an object of the present invention to provide an improved circuit for a cathode ray tube, applicable where the extra high tension for the cathode ray tube is derived separately from the scanning circuits of the tube, with a view to preventing damage to the screen of the tube in the event of failure of the scanning circuits.

A further object of the present invention is to provide a circuit for a cathode ray tube comprising deflecting means for deflecting the beam of said tube, means for utilising energy regained from said deflecting means to provide an increment in a high tension supply for said circuit, and protective means sensitive to said increment to reduce the intensity of said beam in the event of failure of said deflecting means.

In order that the invention may be clearly understood and readily carried into effect, the invention will be described with reference to the accompanying drawings, in which:

Figure 1 shows one embodiment of the invention, and Figure 2 shows a modification of Figure 1.

Referring to Figure 1, the tube 1 is the cathode ray tube of a television receiver, and it will be assumed that the receiver is of the kind in which the extra high tension for the second anode of the tube is generated in a circuit which is separate from the line scanning circuit for the tube. Reference 2 denotes the lead for applying the extra high tension to the tube, 3 denotes the control electrode and 4 the cathode of the tube 1. The tube has a control electrode-to-cathode circuit for applying picture signals to the control electrode in order to modulate the electron beam emitted from the cathode 4. The output stage of the line scanning circuit for the tube 1 comprises the components enclosed within the dotted rectangle 5. These components comprise a line output valve 6, an autotransformer 7 in the anode lead of valve 6, and scanning coils 8 which are connected between the upper terminal (in the drawing) of the transformer 7 and an intermediate tap thereof. The upper terminal of the autotransformer 7 is also connected via a boost capacitor 9 to the positive high tension line 10 of the receiver and a damping diode 11 is connected from the intermediate tap on the transformer 7 to the high tension line 10.

The circuit so far described is of conventional construction and in operation of the receiver, a current variation of sawtooth waveform is produced in the scanning coils 8 on the application of a suitable controlling waveform to the control electrode of the output valve 6. The diode valve 11 functions as a damping device and during a first part of each forward stroke of the sawtooth waveform the capacitor 9 receives an increment of charge via the diode 11 whereby energy in the line scanning circuit at the end of each forward stroke is regained and serves, when equilibrium has been attained, to maintain a substantially uniform potential difference between the plates of the capacitor 9 with the polarity indicated in the drawings. Since this potential difference occurs between the high tension line 10 and the anode of the valve 6 it serves to augment the high tension supply for the anode circuit of the valve 6.

The frame scanning circuit for the cathode ray tube 1 may be entirely conventional and is not shown in the drawing.

The cathode 4 of tube 1 is connected to the slider 12 of a potentiometer 13 connected between the anode 14 of a transfer control device in the form of a valve 15 and the normal high tension line 10 of the receiver. The cathode 16 of the valve 15 is connected to the point of connection of the resistors 18 and 17 and the remote ends of these resistors are connected respectively to ground and to the high tension line 10. The control grid 19 of the valve 15 is likewise connected to the junction of a pair of resistors, namely, the resistors 20 and 21 and the remote ends of these resistors are connected respectively to ground and the point 22. As aforesaid, the potential at the point 22 is the sum of the potential on the line 10 and the potential set up across the boost capacitor 9. A capacitor 23 provides a low impedance path from the cathode 4 of the cathode ray tube 1 to ground for all signal frequency components except D. C.

In the normal operation of the circuit the valve 15 is arranged so as to be conducting and the slider 12 is set so as to apply such a potential to the cathode 4 of the cathode ray tube that the correct beam current is set up in the tube 1. In the event of failure of the line scanning circuit 5, energy recovery from this circuit will cease and consequently the capacitor 9 will discharge and the potential at point 22 will drop. This drop of potential will be communicated via the potentiometer formed by the resistors 20 and 21 to the control grid 19 of the valve 15 and the circuit is so arranged that the valve 15 is then rendered non-conducting. When the valve 15 ceases to conduct the potential of the slider 12 is caused to rise and, this increase of potential being communicated to the cathode 4 of the cathode ray tube 1, the beam of the cathode ray tube is reduced in intensity or is cut-off so preventing damage by the beam to the screen of the cathode ray tube. In order to ensure that the reduction of intensity of the cathode ray beam takes place as rapidly as possible the energy stored in the capacitors 9 and 23 should be arranged to be suitably small by a suitable choice of the capacities of 9 and 23.

The arrangement possesses the additional advantage that in the event of failure of the valve 15 to conduct the beam of the cathode ray tube is automatically reduced in intensity so that in this way the screen of the cathode ray tube is protected also against failure of the protection circuit.

In some television receivers, the circuit for generating the extra high tension and the line scanning circuit may derive operating power from separate high tension supplies. In this case the resistors 13 and 17 should be connected to the high tension supply for the extra high tension generating circuit, instead of the high tension line 10 supplying the line scanning circuit so as to avoid risk of the beam power being maintained in the event of a failure of the high tension supply to the line 10, but not to the extra high tension generating circuit.

Referring to Figure 2, a simplified arrangement embodying the invention is indicated, this arrangement being suitable when it is desired to control the cathode ray tube by applying the picture signals to its cathode rather than to its control grid as in Figure 1. Thus in Figure 2 the control electrode-to-cathode circuit of the tube 1 is such that the picture signals are applied to the cathode 4 of the cathode ray tube 1 and instead of connecting the cathode 4 to the slider 12 as in Figure 1 the control electrode 3 is connected to the slider 12. As distinct from Figure 2 the potentiometer 13 carrying the slider 12 is not connected between the high tension line 10 and ground but is connected in series with and between the resistors 24 and 25 arranged as shown between the point 22 and ground. The condenser 23 connected between the control electrode 3 and ground serves a similar purpose as in the arrangement of Figure 1.

In the event of failure of the line scanning circuit the potential of the point 22 will fall as explained above and this fall will be communicated to the control electrode 3 of the cathode ray tube and will cut-off the beam of the cathode ray tube or reduce the intensity of the beam so that the screen of the cathode ray tube is not damaged by the beam.

It will be realised that the invention is not only of application to circuits where the extra high tension is derived from a local generator of oscillations separate from the line scanning circuit of the receiver but is of application in any instance where the extra high tension is derived independently of the operation of the line scanning circuits and may be used in particular when the extra high tension is derived from a 50 cycle mains supply.

What I claim is:

1. A cathode ray tube circuit comprising a cathode ray tube having a fluorescent screen, a cathode, and a control electrode, an input circuit for applying signals between said control electrode and cathode to modulate the beam in said tube and produce a light image on said screen, a scanning circuit for said tube including a scanning coil, a capacitor and a damping device connected to recover energy from said scanning circuit and thereby charge said capacitor, a source of potential for said scanning circuit, circuit connections for applying the potential of said source augmented by the potential set up across said capacitor to said scanning circuit, a potential divider, circuit connections for applying the potential from said source augmented by the potential set up across said capacitor across said potential divider, and a circuit connection from an intermediate point on said potential divider to said input circuit to inject a potential responsive to the potential across said capacitor into said cathode ray tube input circuit to reduce the intensity of the beam in said tube when the beam is not deflected by said scanning circuit.

2. A cathode ray tube circuit comprising a cathode ray tube having a fluorescent screen, a cathode, and a control electrode, an input circuit for applying signals between said control electrode and cathode to modulate the beam in said tube and produce a light image on said screen, a scanning circuit for said tube including a scanning coil, a capacitor and a damping device connected to recover energy from said scanning circuit and thereby charge said capacitor, a source of potential for said scanning circuit, circuit connections for applying the potential of said source augmented by the potential set up across said capacitor into said scanning circuit, and protective means for injecting a potential responsive to the potential across said capacitor into said cathode ray tube input circuit to reduce the intensity of the beam in said tube when the beam is not deflected by said scanning circuit, said protective means comprising a transfer control device having at least an input electrode and an output electrode, means for applying a potential derived from said capacitor to said input electrode, connections for maintaining said transfer control device non-conducting on removal of said derived potential, and a coupling from said output electrode to said cathode ray tube input circuit to reduce the intensity of the beam in said tube when said transfer control device is rendered non-conducting.

References Cited in the file of this patent

UNITED STATES PATENTS

| | | |
|---|---|---|
| 2,261,776 | Poch | Nov. 4, 1941 |
| 2,476,167 | Wendt | July 12, 1949 |
| 2,514,079 | Lockhart | July 4, 1950 |
| 2,638,562 | Schipper et al. | May 12, 1953 |
| 2,651,002 | De Cola | Sept. 1, 1953 |